R. W. BRYAN.
SHOCK ABSORBER FOR AUTOMOBILES.
APPLICATION FILED JAN. 25, 1917.
1,237,466.
Patented Aug. 21, 1917.
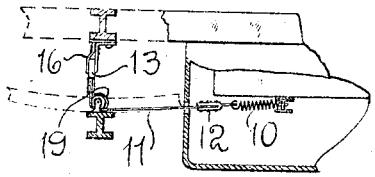
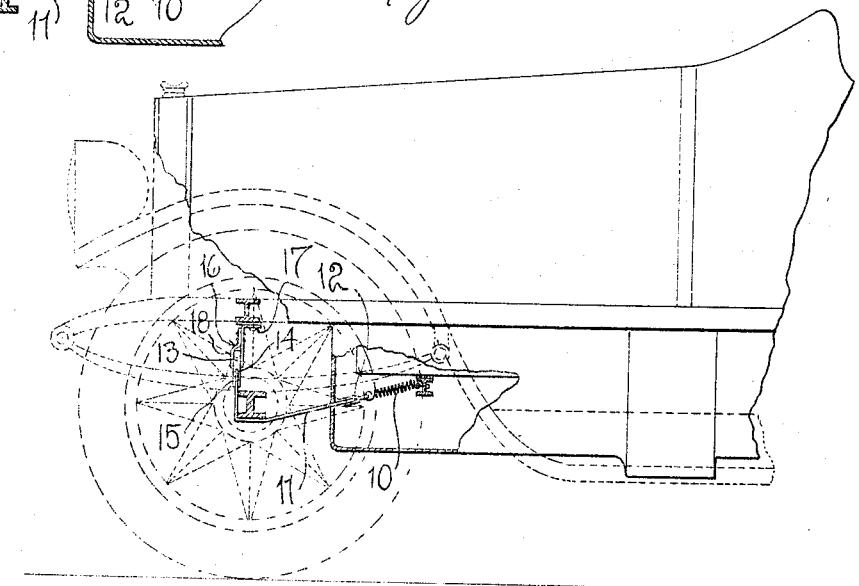
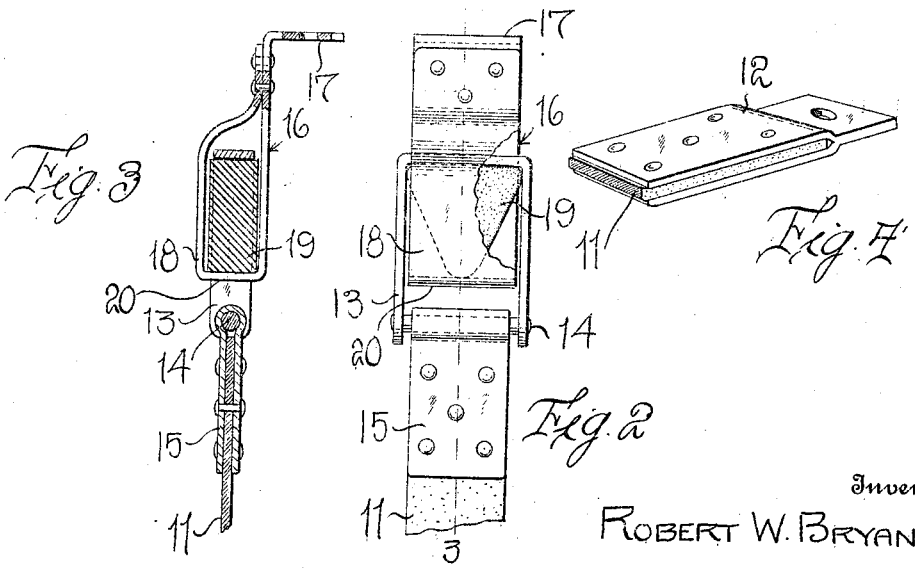
Inventor
ROBERT W. BRYAN
By Watson E. Coleman
Attorney

UNITED STATES PATENT OFFICE.

ROBERT W. BRYAN, OF ABERDEEN, WASHINGTON.

SHOCK-ABSORBER FOR AUTOMOBILES.

1,237,466.   Specification of Letters Patent.   Patented Aug. 21, 1917.

Application filed January 25, 1917. Serial No. 144,455.

*To all whom it may concern:*

Be it known that I, ROBERT W. BRYAN, a citizen of the United States, residing at Aberdeen, in the county of Grays Harbor and State of Washington, have invented certain new and useful Improvements in Shock-Absorbers for Automobiles, of which the following is a specification, reference being had to the accompanying drawings.

This invention relates to automobile attachments and particularly to shock absorbers. The general object of my invention is to provide a very simple form of shock absorber which may be easily applied to all cars and which may be cheaply made and which is in the form of a "snubber" which resiliently resists the rise of the chassis of a car relatively to the axle thereof, or in other words the undue separation of the axle and the chassis under jolting action.

A further object of the invention is to provide a device of this character including a strap or other flexible band, a contractile spring connected at one end to the band, and a clip connected to the other end of the band whereby the band may be connected to the chassis of the automobile, this clip including an elastically compressible element and a connection which permits a certain lateral flexibility in the clip.

Other objects will appear in the course of the following description.

My invention is illustrated in the accompanying drawings, wherein—

Figure 1 is a fragmentary elevation of an automobile showing my improved shock absorber applied thereto;

Fig. 2 is an elevation partly broken away of that end of the shock absorber which engages the frame of the machine above the axle;

Fig. 3 is a sectional view on the line 3—3 of Fig. 2;

Fig. 4 is a perspective view of the clip which engages the spring with the strap 11; and Fig. 5 is a sectional view on the same line as Fig. 1 showing a slight modification of my invention.

Referring to these drawings, it will be seen that my improved attachment comprises a coil spring 10 of any suitable gage and of any suitable length and connected to this spring is a strap 11. This strap may be of any desired length or strength and is shown as being provided with a clip 12 riveted to the strap, this clip extending beyond the strap and having an aperture for engagement by the loop at one end of the coil spring 10. Preferably this clip is formed of a strip of metal bent upon itself and riveted to the strap.

Preferably connected to the other end of the strap is a clip whereby the strap may be connected to the chassis of the automobile. This clip comprises an approximately U-shaped bail or yoke designated 13, the ends of which carry the transversely extending pintle 14, this pintle passing through a clip 15 riveted to the end of the strap 11 and projecting slightly beyond it for the accommodation of the pintle 14. Coacting with the U-shaped member 13 is an attaching member designated 16 formed of strap iron bent at one end to provide a flange or lug 17, and having its body bent upon itself to form an elongated housing 18 through which the cross bar of the yoke 13 passes. The housing 18 is approximately as long as the yoke 13 and disposed within the yoke 13 is an approximately triangular cushion 19 of material such as rubber or rubber compound which has a certain degree of elasticity. The base of the triangular cushioning member is disposed against the cross bar of the yoke with the apex of the member directed toward the end wall 20 of the housing 18. This housing, therefore, works against the rounded apex of the cushioning member and permits the yoke to be shifted to an inclination with the housing member while at the same time cushioning this lateral movement of the yoke relative to the housing member. This cushioning member will also yield slightly to any strain tending to pull the yoke from the wall 20.

In the practical use of this invention, two of these snubbing or shock absorbing devices are used for each axle. The flange 17 of the member 16 is bolted or otherwise rigidly connected to the body or chassis of the automobile immediately above the axle to which the snub or shock absorbing device is to be applied and the strap 11 carried down beneath the axle and then carried toward the middle of the machine. A spring 10 is passed through an opening in the oil pan beneath the engine and the extremity of the spring attached in any suitable manner to the engine frame or other relatively rigid part of the machine. Under these circumstances it will of course be obvious that a rebound of the springs which will cause the body to move away from the axle will cause an expansion of the corresponding shock absorbing springs 10 and this rebound will, therefore, be resisted by this action and the shock will be absorbed.

Under certain circumstances it is possible to have the strap 11 extend over the axle but in this case the strap must pass through a specially fitted stationary member built onto the axle. The operation of the device itself, however, is exactly the same as that first described. I have illustrated this second manner of applying the shock absorber, so it will be obvious to those skilled in the art, in Fig. 5 where the strap 11 passes beneath a roller 19 operatively mounted upon the axle of the vehicle.

Having described my invention, what I claim is:

1. A shock absorber or snubber of the character described comprising a flexible connection, a contractile spring attached at one end to the flexible connection, and a clip operatively connected to the other end of the flexible connection and comprising two members, one of said members being adapted to be operatively connected to the frame of the automobile, the other of said members being pivotally connected to the end of the flexible connection, said members having a loose lateral rocking engagement with each other in a plane at right angles to the plane of relative rotation of the flexible connection and the conjoined member.

2. As an article of manufacture, a snubber or shock absorber for automobiles comprising a strap, a coiled contractile spring operatively connected to one end of the strap, a yoke hingedly connected to the opposite end of the strap, and a clip having a flange adapted to be operatively connected to the frame of the automobile, said clip having a loop through which the cross bar of the yoke passes, said cross bar having rocking engagement with the loop in a plane at right angles to the plane of movement of the yoke and stop.

3. As an article of manufacture, a snubber or shock absorber for automobiles comprising a strap, a coiled contractile spring operatively connected at one end of the strap, a yoke hingedly connected to the opposite end of the strap, a clip having a flange adapted to be operatively connected to the frame of the automobile, said clip having a loop through which the cross bar of the yoke passes, and a cushioning member disposed between the end wall of said loop and the cross bar of the yoke.

4. As an article of manufacture, a snubber or shock absorber for automobiles comprising a strap, a coiled contractile spring operatively connected at one end of the strap, a yoke hingedly connected to the opposite end of the strap, a clip having a flange adapted to be operatively connected to the frame of the automobile, said clip having a loop through which the cross bar of the yoke passes, and a cushioning member disposed between the end wall of said loop and the cross bar of the yoke, said cushioning member being triangular in form, the apex of the triangle confronting the end of said loop.

In testimony whereof I hereunto affix my signature in the presence of two witnesses.

ROBERT W. BRYAN.

Witnesses:
W. C. BIRDWELL,
LUROY HERRIMAN.

Copies of this patent may be obtained for five cents each, by addressing the "Commissioner of Patents, Washington, D. C."